VEHICLE DOOR LATCH

Original Filed July 27, 1964 4 Sheets-Sheet 1

INVENTOR
Harry J. Shay
by Wolfe, Hubbard, Vait & Dann
ATTORNEYS

VEHICLE DOOR LATCH

Original Filed July 27, 1964 4 Sheets-Sheet 2

INVENTOR
Harry J. Shay
by Wolfe, Hubbard, Vait & Dawson
ATTORNEYS

VEHICLE DOOR LATCH

Original Filed July 27, 1964 4 Sheets-Sheet 3

INVENTOR

Harry J. Shay by Wolfe, Hubbard, Leit & Dugan

ATTORNEYS

VEHICLE DOOR LATCH

Original Filed July 27, 1964 4 Sheets-Sheet 4

INVENTOR
Harry J. Shay
by Wolfe, Hubbard, Vait & Dann
ATTORNEY

United States Patent Office

Re. 27,122
Reissued Apr. 27, 1971

27,122
VEHICLE DOOR LATCH

Harry J. Shay, Southfield, Mich., assignor to
L. W. Menzimer, Trustee, Rockford, Ill.

Original No. 3,359,026, dated Dec. 19, 1967, Ser. No. 613,375, Dec. 29, 1966, which is a continuation of Ser No. 385,171, July 27, 1964. Application for reissue Aug. 8, 1969, Ser. No. 853,570
Int. Cl. E05c *3/36*
U.S. Cl. 292—198 11 Claims

Matter enclosed in heavy brackets [ ] appears in the original patent but forms no part of this reissue specification; matter printed in italics indicates the additions made by reissue.

*ABSTRACT OF THE DISCLOSURE*

*A dual preset latch for a vehicle door may be placed in a locked condition without the use of a key by first shifting an inside garnish button to a locked position while the door is open and then by only momentarily depressing an outside push button. The door then may be closed and will lock automatically without need of holding the push button depressed as the door is swung shut.*

This application is a continuation of my copending application Ser. No. 385,171, filed July 27, 1964, and now abandoned.

The present invention relates to a latch of the type commonly used for the doors of an automotive vehicle and more particularly, to a latch which may be locked from the inside as by the conventional remote control handle or garnish molding button or from the outside by a key.

The general object of the invention is to provide a new and improved latch of the above character which may be placed in a locked condition while the door is open and remains in this condition as the door is closed without requiring any further operations other than the simple closing of the door but which minimizes the possibility of accidentally closing the door in the locked condition.

A more detailed object is to construct the latch so that two separate manual operations performed in the proper sequence are required to place the latch in the locked condition and, thereafter, the door may simply be closed and the latch remains locked.

Another object is to arrange the parts so that, if only the first manual operation is performed and the door then is closed, the door will be closed and latched but the latch will automatically return to the fully unlocked condition upon closing of the door.

Other objects and advantages of the invention will become apparent from the following detailed description taken in connection with the accompanying drawings, in which FIG. 1 is a perspective view of an automobile door utilizing a latch constructed in accordance with the present invention.

Figure 1:
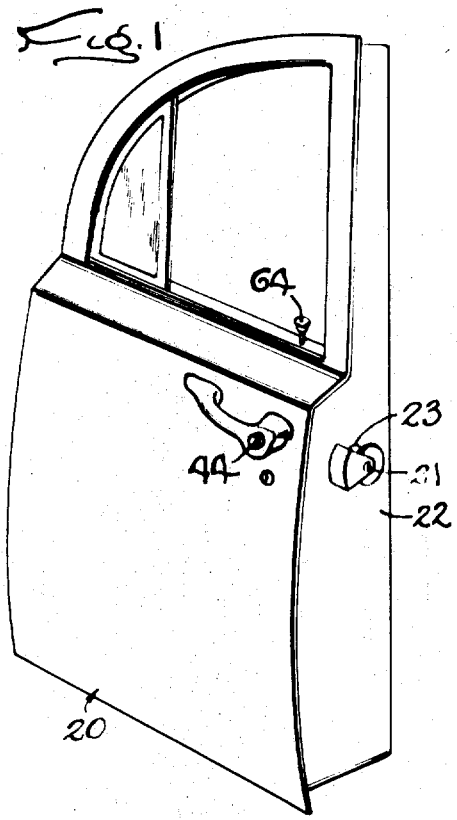
Figure 2:
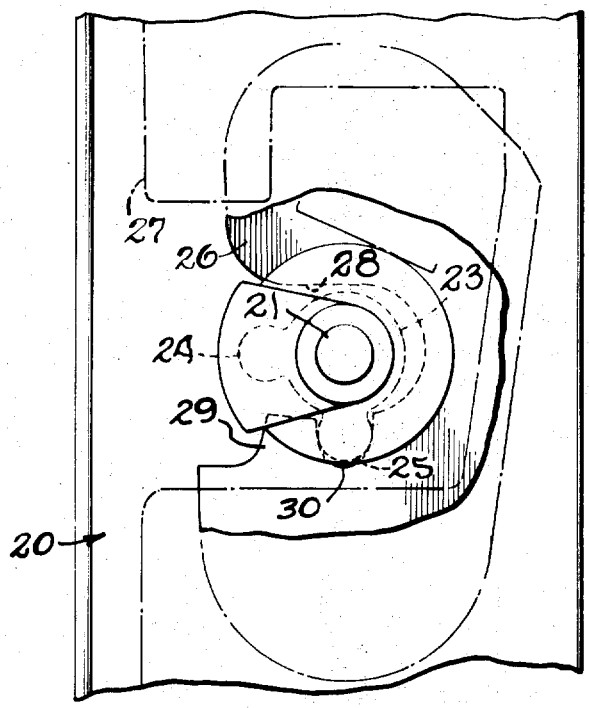
FIG. 2 is an enlarged fragmentary end view of the latch and the striker.

As shown in the drawings for purposes of illustration, the invention is embodied in a latch of the type commonly used for the door 20 of a vehicle such as an automobile. In general, the [catch] *latch* is mounted interiorly of the door with a shaft 21 projecting through the end wall 22 of the door and carrying a latching member 23. The latter, in the present instance, is a rotary member keyed to the shaft 21 and formed with two gear teeth 24 and 25 which coact with a striker 26 mounted on a post 27 of the vehicle frame. The striker may, as illustrated in the drawings be a plate with a recess 28 opening through the outer side of the plate and formed with a tooth 29 and a pocket 30 along the lower side of the recess. Thus, as the door 20 is closed, the tooth 24 engages the tooth 29 on the striker 26 and further closing of the door rotates the latch member or gear 23 so that the second tooth 25 rolls into the pocket 30.

Figure 12:
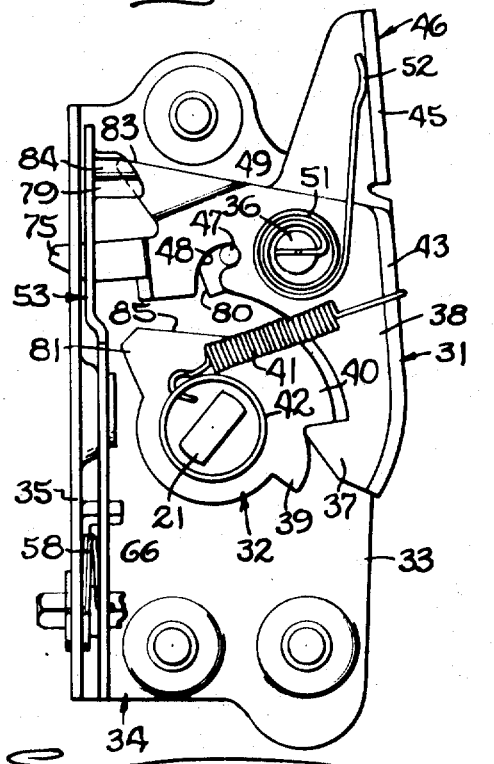
FIG. 12 is a view similar to FIG. 3 but shows the parts in the safety latched position.

When the tooth 25 is received in the pocket 30, the door 20 is in the closed position and, to latch the door in this position, a pawl 31 (FIG. 3) engages a ratchet 32 which is keyed to the shaft 21 on the inner side of the door wall 22. Herein, the shaft 21 is journaled on one leg 33 of an L-shaped support or bracket 34, the leg 33 being secured to the inside of the wall 22 while the other leg 35 of the bracket extends alongside the inner wall of the door. The pawl 31 is in the form of a bell crank lever which is fulcrumed by a stub shaft 36 to turn about an axis paralleling the axis of the shaft 21 and which includes a tooth 37 integral with one arm 38 of the bell crank lever to engage one or the other of the teeth 39 and 40 of the ratchet 32. When the pawl tooth 37 engages the ratchet tooth 39, the door 20 is in the fully latched position and the door is latched in the usual safety position when the pawl tooth 37 engages the tooth 40 on the ratchet (see FIG. 12).

Figure 16:
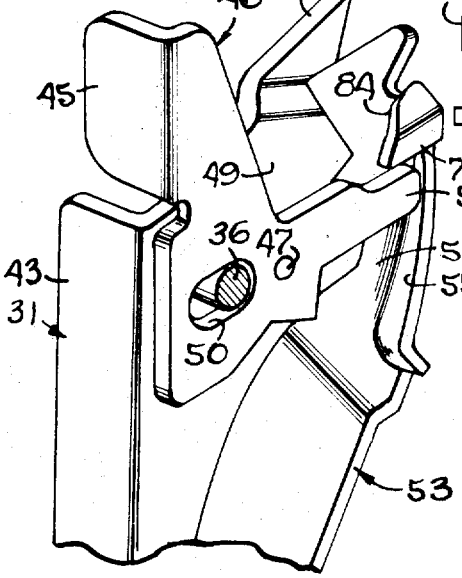
FIG. 16 is a fragmentary perspective view of the principal parts of the latch.

The pawl 31 is biased into engagement with the ratchet 32 by a contractile spring 41 which acts between a circular flange 42 on the ratchet and a flange 43 on the pawl lever. The latch may be released from outside the vehicle by the conventional push button 44 (FIGS. 1 and 3) which abuts a flange 45 on a contactor lever 46 fulcrumed on the stub shaft 26. The contactor is coupled to the pawl 31 by a pin 47 which projects laterally from the contactor and into a curved slot 48 in the other arm 49 of the pawl lever. The fulcruming of the contactor 46 on the shaft 36 is accomplished by means of a slot 50 (FIG. 16) formed in the contactor and receiving the shaft and the slot 48 is not concentric with the shaft. Thus, when the contactor is turned by depressing the push button 44, the pin 47 follows the slot 48 and the contactor shifts to the left as viewed in FIG. 3. As a result, the contactor makes an idle motion and the pawl 31 remains in engagement with the ratchet 32. When, however, the contactor is restrained against such shifting as will be explained later, the pin 47 transmits the turning motion of the contactor to the pawl and this swings the pawl out of engagement with the ratchet to permit opening of the door. The contactor 46 is urged in the clockwise direction toward the position in which the pin 47 is at the bottom of the slot 48 by a coiled torsion spring 51 whose inner end is anchored to the stud shaft 36 and whose outer end 52 bears on the flange 45 of the contactor.

Figure 4:
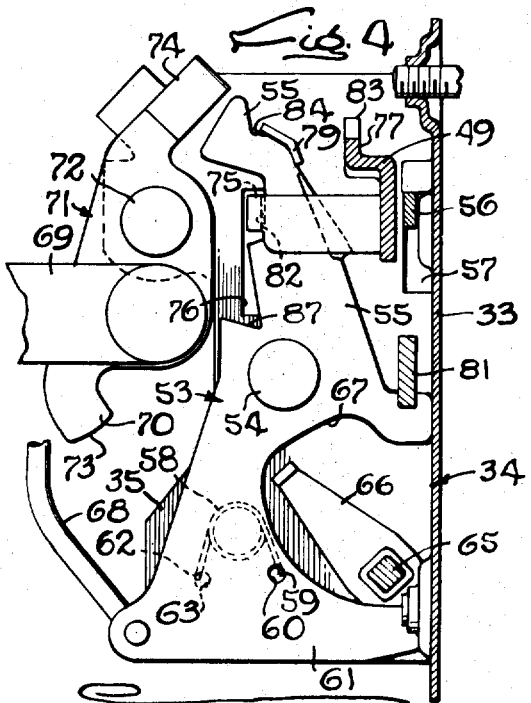
FIG. 4 is a sectional view taken along the line 4—4 in FIG. 3.
Figure 5:
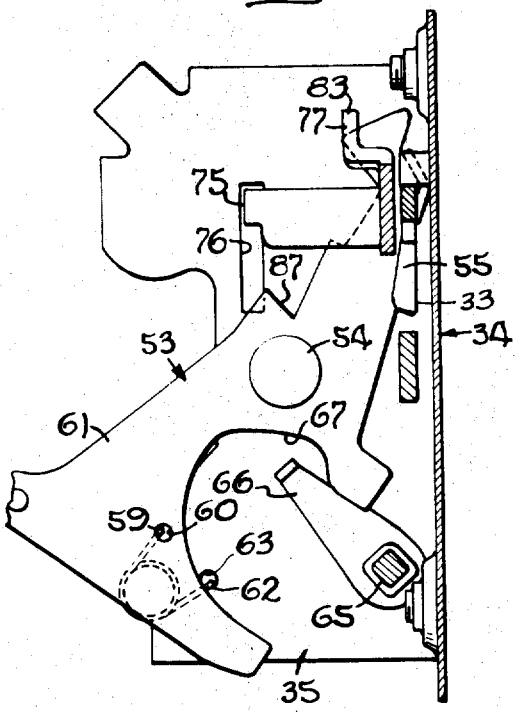
FIG. 5 is a view similar to FIG. 4 but shows the parts in the unlocked position.
Figure 6:
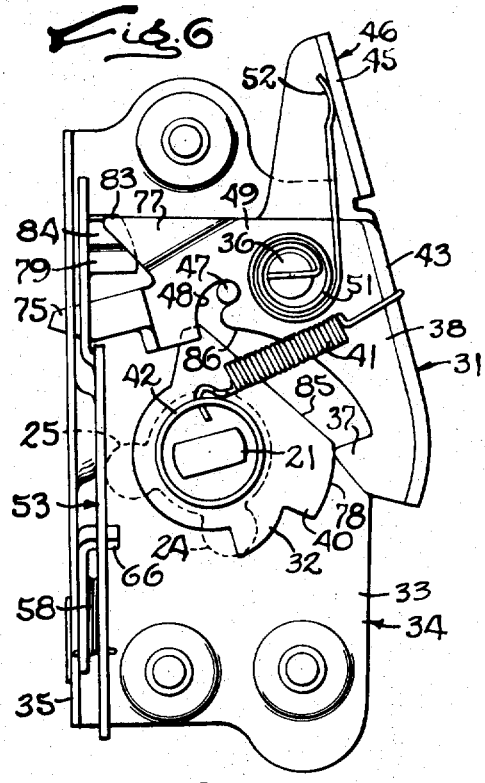
FIG. 6 is a view similar to FIG. 3 but shows the parts in the unlatched and unlocked position.

In order to lock the latch, an upright locking lever 53 is fulcrumed intermediate its ends on the leg 35 of the bracket 34 by means of a stud 54 to swing about an axis which is at right angles to the axis of the pawl 31. In its unlocked position as illustrated in FIG. 5, the upper arm 55 of the locking lever is disposed adjacent the bracket leg 33 and directly in front of the end of an arm 56 (FIG. 16) on the contactor 46 and, in this position, the locking lever covers a slot 57 (FIG. 11) in the bracket leg 35. As a result, the arm 56 engages an arcuate surface 55a on the locking lever as the contactor is turned by the push button 44 and this prevents the contactor from shifting forward as permitted by the slot 50. The pin 47, therefore, transmits the turning motion to the pawl 31 which swings out of engagement with the ratchet 32. When the locking lever is turned counterclockwise to the locked position as shown in FIG. 4, the arm 56 may project through the slot 57 whereby the contactor, when turned, slides forward on the stud shaft 36 and makes an idle motion without turning the pawl.

Figure 7:
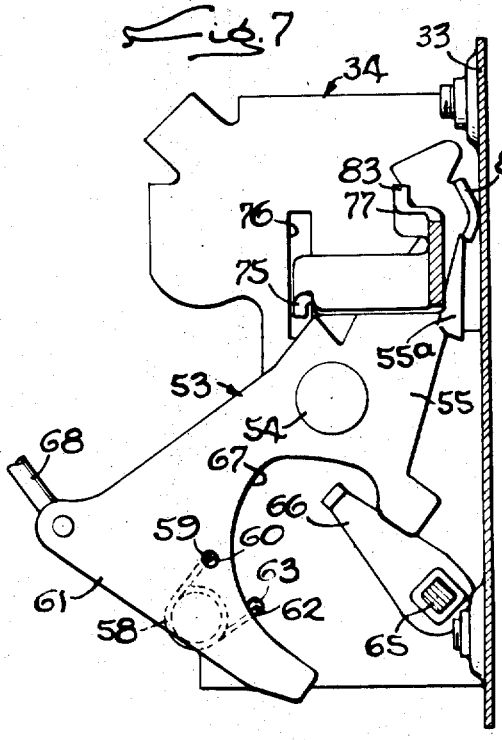
FIG. 7 is a view similar to FIG. 4 but shows the parts in the unlatched and unlocked position.

The locking lever 53 is biased toward the locked and unlocked positions by an over-center spring 58 which acts between the bracket 34 and the locking lever. Herein, the spring 58 is a coiled torsion spring disposed between the locking lever and the leg 35 of the bracket and the ends of the spring are anchored by projecting the end 59 through a hole 60 in the locking lever arm 61 and the end 62 through a hold 63 in the bracket leg 35. Thus, as the locking lever is turned away from the unlocked position (FIG. 7) toward the locked position (FIG. 4), the end 59 of the spring 58 moves from the left to right until it crosses the center line a (FIG. 8) which extends between the spring end 62 and the center of the stud 54. As the spring crosses center, it snaps the locking lever to the locked position. The same snap action is obtained when the lever is turned in the opposite direction.

As is customary with latches of this type, the locking lever 53 may be turned back and forth from outside the door 20 by a key and from inside either by a garnish molding button 64 (FIG. 1) or a remote control handle (not shown). Thus, a square shaft 65 (FIGS. 3 and 4) which may be turned by a key carries an arm 66 projecting into a notch 67 in the locking lever arm 61 so that the locking lever is turned back and forth by the arm 66 by turning the shaft 65. Additionally, the locking lever may be turned by lifting or depressing the garnish molding button 64 which is connected to the lower arm 61 of the locking lever by a link 68.

The remote control handle is connected by a link 69 (FIG. 4) to the lower arm 70 of a lever 71 which is fulcrumed at 72 on the leg 35 of the mounting bracket 34. An abutment 73 on this arm engages the arm 61 of the locking lever 53 when the latter is in the unlocked position and the remote control lever 71 is turned counterclockwise as viewed in FIG. 4 and this swings the locking lever to the locked position. If the lever 71 is turned in the opposite direction when the locking lever is in the locked position, the upper arm 74 of the lever 71 abuts the upper arm 55 of the locking lever and swings the latter toward the unlocked position. Upon continued turning of the lever 71, the arm 74 engages a laterally offset extension 75 of the arm 49 of the pawl 31 so that the pawl is swung out of engagement with the ratchet 32 and the latch is released, the extension 75 being guided by a slot 76 in the bracket wall 35.

According to the present invention, the latch is constructed so that, when the door is open, the parts may be placed in locked position by two separate manual operations and thereafter the door may be closed and the latch will remain [closed] *locked* without further manipulation of the parts. The two manual operations must be performed in a predetermined order and, moreover, if only the first operation is performed when the door is closed, the latch returns to the fully unlocked condition. In this way, there is very little possibility of the door being closed and locked from the outside by accident, and, at the same time, it is not necessary to use a key or to keep the push button 44 depressed as the door is closed or to perform any other operation during or after the closing of the door.

Figure 13:
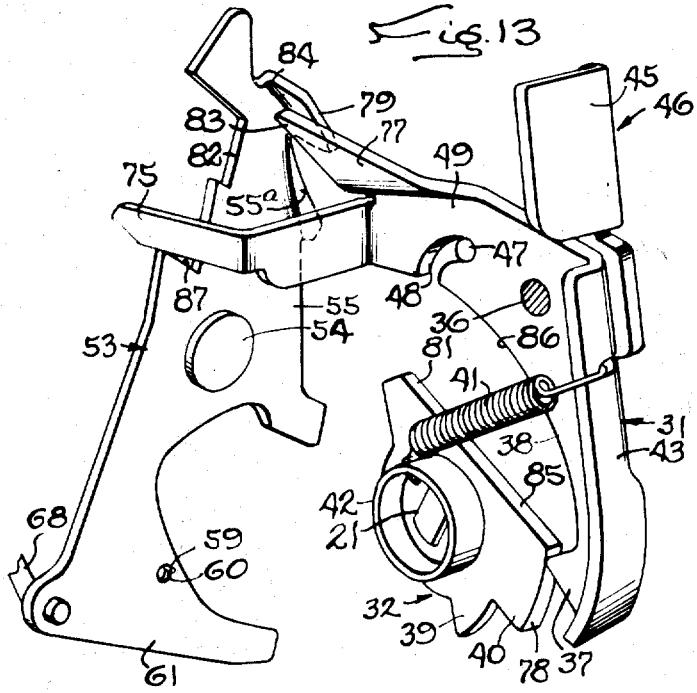
FIG. 13 is a perspective view of the principal parts of the latch.
Figure 14:
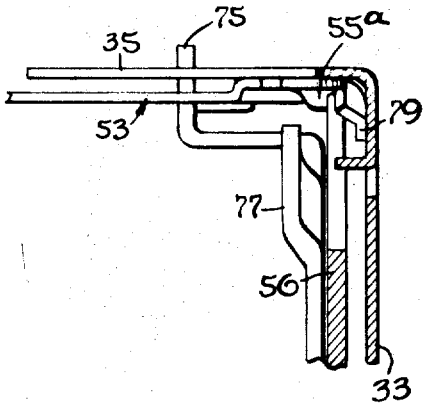
FIG. 14 is a top view of the latch.
Figure 15:
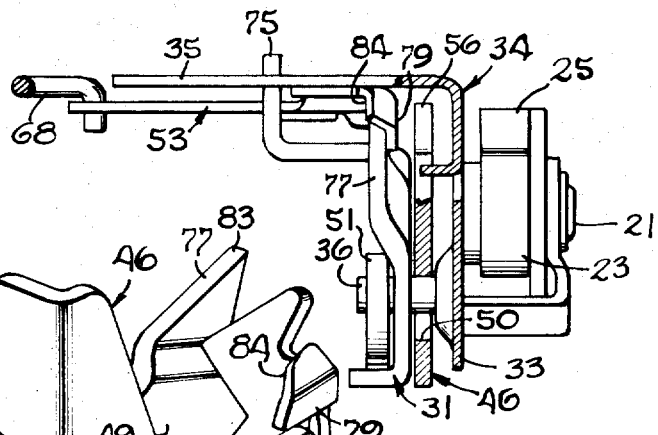
FIG. 15 is a sectional view taken along the line 15—15 in FIG. 3.

To achieve the foregoing, the latch is provided with a movable detent 77 which, when the door 20 is open and the ratchet 32 is in the released position, is disposed in the path of the locking lever 53. The first manual operation is performed in the present instance by depressing the garnish molding button 64 which moves the locking lever away from the unlocked position. This lever, however, is intercepted by the detent 77 and held in an intermediate position as illustrated in FIG. 13. The second operation may, as illustrated, be performed by the push button 44 which is effective to move the detent 77 out of the path of the locking lever and release the latter for continued movement toward the locked position. Thereafter, the door need only be closed with nothing further and the latch will remain in the locked condition.

Figure 8:
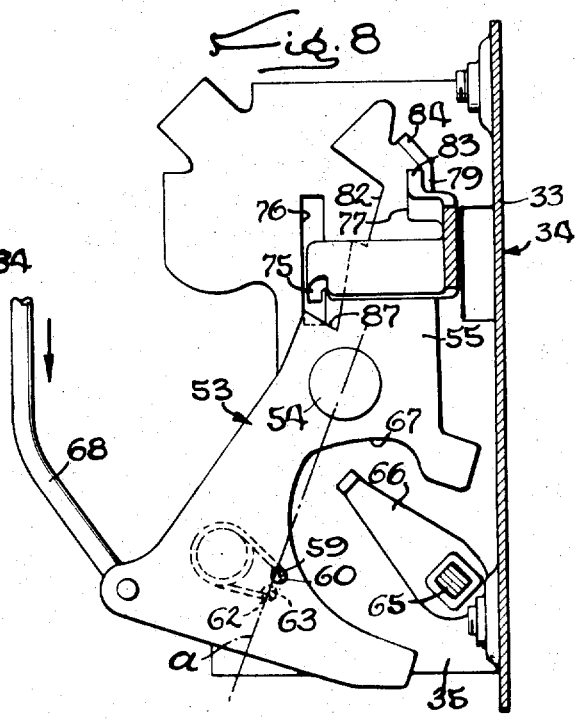
FIG. 8 is a view similar to FIG. 7 but shows the parts after the first manual operation.

In the preferred form of the invention, the detent 77 is a finger projecting forwardly and upwardly from the arm 49 of the pawl lever 31. When the door is open, the tooth 37 of the pawl abuts a surface 78 of the ratchet 32 and this holds the pawl in a position intermediate its two extreme positions. In this position of the pawl, the finger 77 projects into the path of an ear 79 formed integrally with and projecting laterally from the upper arm 55 of the locking lever 53. Thus, when the garnish molding button 64 is depressed, the locking lever is turned away from the unlocked position (FIG. 7) to an intermediate position in which the ear 79 abuts the finger 77 as shown in FIG. 8. In this position, the spring 58 is just over center, that is, the end 59 of the spring is slightly across the center line a, and, as a result, the spring holds the locking lever in this position.

Figure 3:
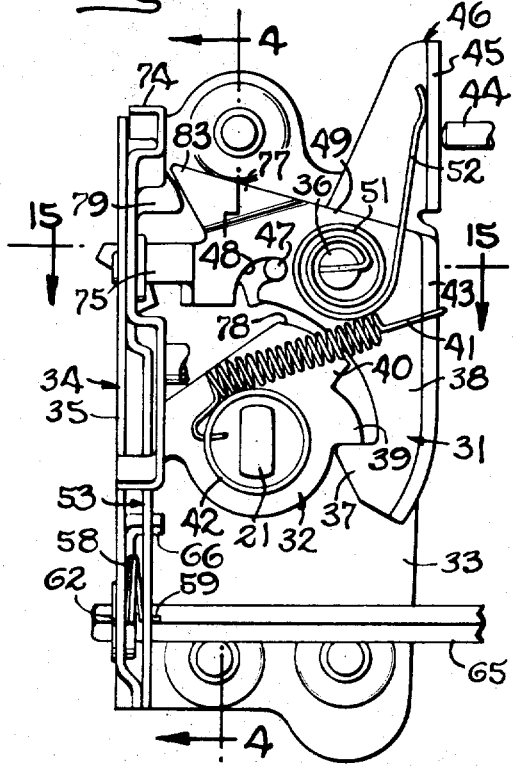
FIG. 3 is an end view of the latch and shows the parts in the latched and locked position.
Figure 9:
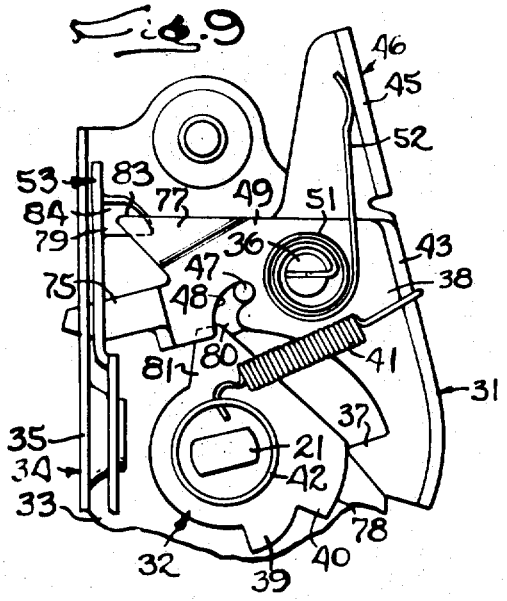
FIG. 9 is a view similar to FIG. 6 but shows the parts after the first manual operation.
Figure 10:
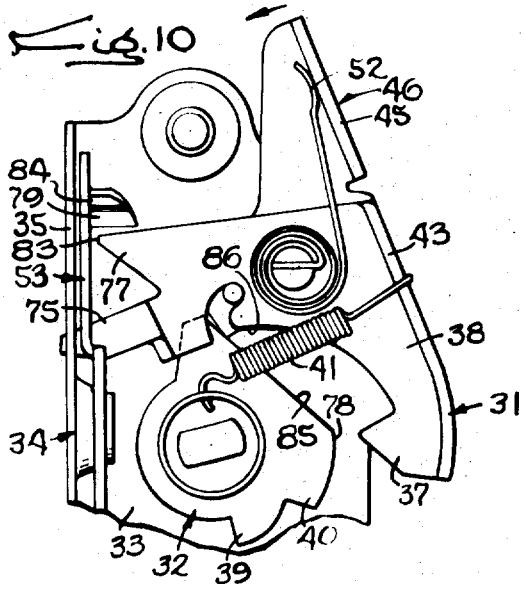
FIG. 10 is a view similar to FIG. 9 but shows the parts after the second manual operation.
Figure 11:
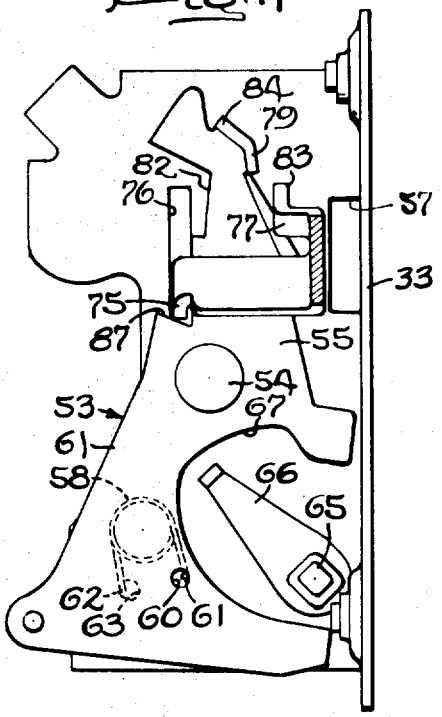
FIG. 11 is view similar to FIG. 8 but shows the parts after the second manual operation.

The second manual operation, the depressing of the push button 44, turns the contactor 46 counterclockwise from the position shown in FIG. 9 to that in FIG. 10. At this time, the end 56 of the contactor is not blocked by the locking lever 53 but an edge 80 (FIG. 9) of the contactor is blocked by a lobe 81 on the ratchet 32 so that the pawl 31 is turned in the same direction as the contactor. As shown in FIG. 10, this moves the finger 77 below the ear 79 and, as a result, the locking lever continues its movement toward the locked position. Herein, the locking lever at this time comes up against the extension 75 on the pawl and stops short of the final locked position as illustrated in FIG. 11. Closing of the door 20 then turns the gear 23 and hence the ratchet 32 back to the latched position and this permits the pawl 31 to turn back into engagement with the ratchet tooth 39 as shown in FIG. 3. The extension 75 thereby moves up in the slot 76 and the locking lever moves to its final position (FIG. 4) as permitted by a notch 82 in the side of the lever.

In case the door 20 is closed after the garnish molding button 64 has been depressed but before the [puh] *push* button 44 has been depressed to release the ear 79, the locking lever 53 is automatically returned to the unlocked position. To accomplish this, means is provided which is responsive to the turning movement of the ratchet 32 as the door is closed and which cams the locking lever toward the unlocked position an amount sufficient to move the spring 58 back across center whereby the spring snaps the locking lever fully back to the unlocked position. Herein, this means comprises the upper edge 83 (FIG. 13) of the finger 77 which acts as a cam and which coacts with a follower 84 on the locking lever. The follower is an extension of the ear 79 above the latter (see FIG. 8) and is inclined upwardly and away from the leg 33 of the bracket 34. Thus, as the arm 49 of the pawl 31 moves up due to the return of the pawl to latching engagement with the ratchet 32, the finger 49 also moves up whereby the cam action between the edge 83 and the follower 84 turns the locking lever clockwise until the spring end 59 crosses the center a. Thereupon, the spring 58 completes the return of the locking lever to the unlocked position. As shown in FIG. 3, the ear 79 and the follower 84 pass under the finger 77 when the pawl is in the latched position so that the locking lever may be turned back and forth in this condition of the latch.

Means is provided to move the pawl 31 into engagement with the ratchet 32 even though the door is closed with the push button 44 held in the depressed position, that is, with the parts remaining in the position shown in FIG. 10. This means comprises a cam surface 85 which is formed on the ratchet and which, as the ratchet is turned from the released to the latched position, engages a surface 86 on the pawl. Thus, the surface 85 cams the pawl in a clockwise direction as illustrated in FIG. 10 and this turns the pawl back into engagement with the ratchet regardless of whether the contactor 46 is in the depressed position.

As will be seen in FIG. 8, the spring 58 is just across center when the locking lever 53 is held in the intermediate position and, as a result, the spring exerts a comparatively light force. Accordingly, if there is ice or other foreign matter in the latch, the spring may not complete the movement of the locking lever when the latter is released by the finger 77. In such a case, a positive turning force is applied to the locking lever upon the depression of the push button 44. Thus, the contactor 46, when turned by the push button, turns the pawl 31. The extension 75 on the pawl thereupon abuts a surface 87 on the locking lever and this completes the turning of that lever.

It will be observed that with a latch constructed in accordance with the present invention, there is little danger of closing the door 20 with the latch remaining in the locked condition because two specific manual operations must be performed before this can occur. At the same time, once these two steps are taken, that is, depressing first the garnish molding button 64 and then the push button 44, the door is locked with nothing more than simply swinging it closed.

I claim as my invention:

1. In a door latch, the combination of, a support, a latching member rotatably mounted on said support, a toothed ratchet mounted on said support to turn with said latching member between latched and released positions, a pawl fulcrumed on said support to swing between a first position in which it engages a tooth of said ratchet and a second position in which it releases the ratchet, said pawl being held in an intermediate position by said ratchet when the latter is in said released position, a manual member operable to move the pawl to said second position, a locking member mounted on said support to move between an unlocked position and a locked position in which it prevents movement of said pawl, an over-center spring acting between said support and said locking member to urge the locking member toward said locked and unlocked positions as the spring passes back and forth across center, a part movable with said pawl to be disposed in the path of said locking member when the pawl is in said intermediate position to engage and hold the locking member as the latter moves toward said locking position and after said spring has crossed center, said locking member being released for further movement toward said locked position when said manual member moves said pawl to said second position, and cam means responsive to the movement of said latching member to said latched position and operable when said part is in engagement with said locking member to turn the locking member back toward said unlocked position until said spring crosses back over center.

2. In a door latch, the combination of, a support, a latching member rotatably mounted on said support to turn between latched and unlatched positions, mechanism selectively operable to hold said latching member in said latched position and to release the member for turning to the unlatched position, means including a locking member mounted on said support to move between locked and unlocked positions and operable when in the locked position to maintain the latching member in the latched position and operable when in the unlocked position to permit release of the latching member, said mechanism including movable detent means operable when said latching member is in the unlatched position to stop said locking member in an intermediate position as the locking member is moved away from the unlocked position, a first manual element operable to move said locking member away from the unlocked position and against said detent means, a second manual element subsequently operable to move said detent means and release said locking member for movement to the locked position whereby the sequential operation of said elements places the latch in a locked condition, and cam means operable after the operation of said first element but before operation of said second element and responsive to movement of said latching member to said latched position to move said locking member to said unlocked position.

3. In a door latch, the combination of, a support, a latching member rotatably mounted on said support, a toothed ratchet mounted on said support to turn with said latching member between latched and released positions, a pawl fulcrumed on said base to swing between a first position in which it engages a tooth of said ratchet and a second position in which it releases the ratchet, said pawl being held in an intermediate position by said ratchet when the latter is in said released position, a manual member operable to move said pawl to said second position, a locking member mounted on said support to move between an unlocked position and a locked position in which it prevents movement of said pawl, an over-center spring acting between said support and said locking member to urge the locking member toward said locked and unlocked positions as the spring passes back and forth across center, and a part movable with said pawl to be disposed in the path of said locking member when the pawl is in said intermediate position to engage and hold the locking member as the latter moves toward said locking position and after said spring has crossed center, said locking member being released for further movement toward said locked position when said manual member moves said pawl to said second position and thereby moves said part out of the path of said locking member.

4. In a door latch, the combination of, a support, a latching member rotatably mounted on said support to turn between latched and unlatched positions, mechanism selectively operable to hold said latching member in said latched position and to release the member for turning to the unlatched position, means including a locking lever fulcrumed on said support to turn between locked and unlocked positions and operable when in the locked position to maintain the latching member in the latched position and operable when in the unlocked position to permit release of the latching member, said mechanism including an abutment carried by said lever, movable detent means operable when said latching member is in the unlatched position to engage said abutment and hold said locking lever in an intermediate position as the lever is moved away from the unlocked position, a first manual element operable to turn said locking lever away from the unlocked position and move said abutment against said detent means, and a second manual element subsequently operable to move said detent means out of the path of said abutment and release said locking level for movement to the locked position whereby the sequential operation of said elements places the latch in a locked condition.

5. In a door latch, the combination of, a support, a latching member rotatably mounted on said support to turn between latched and unlatched positions, mechanism selectively operable to hold said latching member in said latched position and to release the member for turning to the unlatched position, means including a locking member mounted on said support to move between locked and unlocked positions and operable when in the locked position to maintain the latching member in the latched position and operable when in the unlocked position to permit release of the latching member, said mechanism including movable detent means operable when said latching member is in the unlatched position to stop said locking member in an intermediate position as the locking member is moved away from the unlocked position, a first manual element disposed on the inside of the door and operable to move said locking member away from the unlocked position and against said detent means, and a second manual element disposed exteriorly of the door and subsequently operable to move said detent means out of the path of said locking member and release said locking member for movement to the locked position whereby the sequential operation of said elements places the latch in a locked condition.

6. In a door latch, the combination of, a support, a latching member rotatably mounted on said support to turn between latched and unlatched positions, mechanism selectively operable to hold said latching member in said latched position and to release the member for turning to the unlatched position, means including a locking member mounted on said support to move between locked and unlocked positions and operable in the locked position to maintain the latching member in the latched position and operable when in the unlocked position to permit release of the latching member, said mechanism including movable detent means operable when said latching member is in the unlatched position to stop said locking member in an intermediate position as the locking member is moved away from the unlocked position, a first manual element operable to move said locking member away from the unlocked position and against said detent means, and a second manual element subsequently operable to move said detent means out of the path of said locking member and release said locking member for movement to the locked position whereby the sequential operation of said elements places the latch in a locked condition.

7. In a door latch, the combination of, a support, a latching member rotatably mounted on said support, a toothed ratchet mounted on said support to turn with said latching member between latched and released positions, a pawl fulcrumed on said base to swing between a first position in which it engages a tooth of said ratchet and a second position in which it releases the ratchet, said pawl being held in an intermediate position by said ratchet when the latter is in said released position, a manual member operable to move said pawl to said second position, a locking member mounted on said support to move between an unlocked position and a locked position in which it prevents movement of said pawl, an over-center spring acting between said support and said locking member to urge the locking member toward said locked and unlocked positions as the spring passes back and forth across center, a part movable with said pawl to be disposed in the path of said locking member when the pawl is in said intermediate position to engage and hold the locking member as the latter moves toward said locking position and after said spring has crossed center, said locking member being released for further movement toward said locked position when said manual member moves said pawl to said second position, and a surface on said pawl and operable when the pawl moves to said second position to engage said locking member and positively move the latter to said locked position.

8. In a latch for a door, the combination of, a support, a latching member mounted on said support to move between latched and unlatched positions, locking mechanism mounted on said support and including a first manual element disposed on the inside of the door and movable in response to a manual operation between locked and unlocked positions, said locking mechanism being operable when said element is in said locked position and when said latching member is in said latched position to maintain the latching member in the latched position and operable when the element is in said unlocked position to permit release of the latching member, canceling means mounted on said support and normally operable to move said manual element from said locked position to said unlocked position as said latching member is moved from said unlatched position to said latched position, and a second manual element disposed on the outside of the door and movable between a normal position and an operating position, said second element being operatively connected to said canceling means and effective, upon movement from said normal position to said operating position and return to said normal position and when said latching member is in said unlatched position and said first manual element is in said locked position, to inactivate said canceling means whereby the latching member may be moved to said latched position while said first manual element remains in said locked position.

9. A latch as defined in claim 8 in which said second manual element also is operable when said first manual element is in said unlocked position to move said latching member from the latched position to the unlatched position.

*10. In a latch for a vehicle door, the combination of a support, a latching member mounted on said support to move between latched and unlatched positions, locking mechanism mounted on said support and including a first manual element disposed on the inside of the door and movable in response to a manual operation between locked and unlocked positions, said locking mechanism being operable when said element is in said locked position and when said latching member is in said latched position to maintain the latching member in the latched position and operable when the element is in said unlocked position to permit release of the latching member, canceling means mounted on said support and normally operable to move said manual element from said locked position to said unlocked position as said latching member is moved from said unlatched position to said latched position, and a second manual element operable from one side of the door and movable between a normal position and an operating position, said second element being operatively connected to said canceling means and effective, upon movement from said normal position to said operating position and return to said normal position and when said latching member is in said unlatched position and said first manual element is in said locked position, to inactivate said canceling means whereby the latching member may be moved to said latched position while said first manual element remains in said locked position.*

*11. In a latch for a vehicle door, the combination of, a support, a latching member mounted on said support to move between latched and unlatched positions, locking mechanism mounted on said support and including a first manual element movable manually from the inside of the door between locked and unlocked positions, said locking mechanism being operable when said element is in said locked position and said latching member is in said latched position to prevent release of the latching member from the latched position and operable when the element is in said unlocked position to permit release of the latching member, canceling means mounted on said support and normally operable to cause movement of said manual element from said locked position to said*

*unlocked position as said latching member is moved from said unlatched position to said latched position with said element disposed in said locked position, and a second manual element operable from one side of the door and movable between a normal position and an operating position, said second element being effective to inactivate the canceling action of said canceling means upon being moved manually toward said operating position and then manually released when said latching member is in said unlatched position and when said first manual element has first been placed in said locked position whereby the latching member may be moved to said latched position without manually holding said second manual element in said operating position and the first manual element will be disposed in said locked position when the latching member reaches said latched position.*

References Cited

The following references, cited by the Examiner, are of record in the patented file of this patent or the original patent.

UNITED STATES PATENTS

| | | | |
|---|---|---|---|
| 2,665,158 | 1/1954 | Wagner | 292—216 |
| 2,993,359 | 7/1961 | Craig | 70—153 |
| 3,027,184 | 3/1962 | DeVito | 292—216 |
| 3,033,602 | 5/1962 | Lee | 292—280 |
| 3,065,013 | 11/1962 | Pickles | 292—280 |

FOREIGN PATENTS

| | | | |
|---|---|---|---|
| 668,937 | 3/1952 | Great Britain | 292—J3 |

RICHARD E. MOORE, Primary Examiner

U.S. Cl. X.R.

292—280